UNITED STATES PATENT OFFICE.

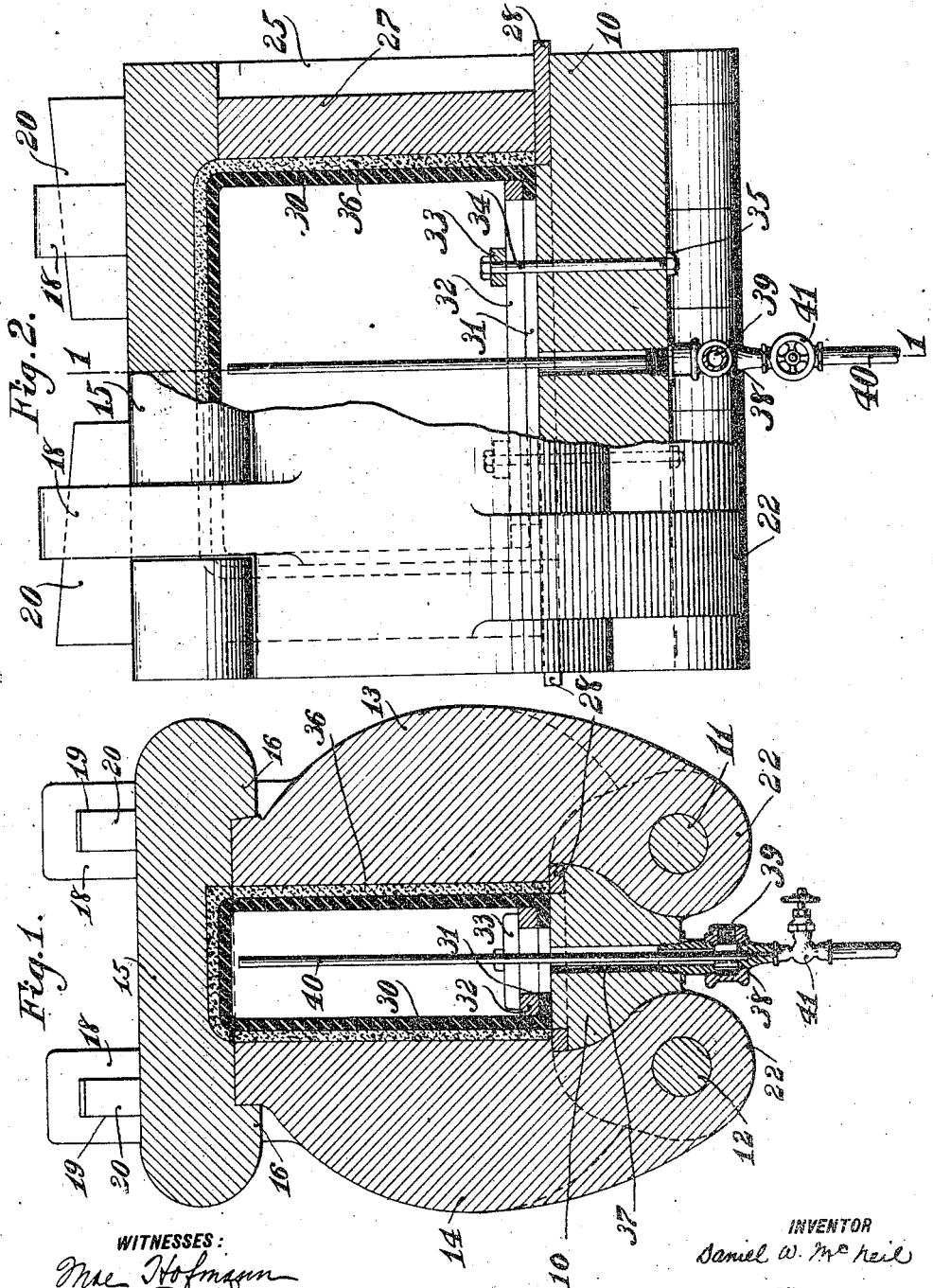

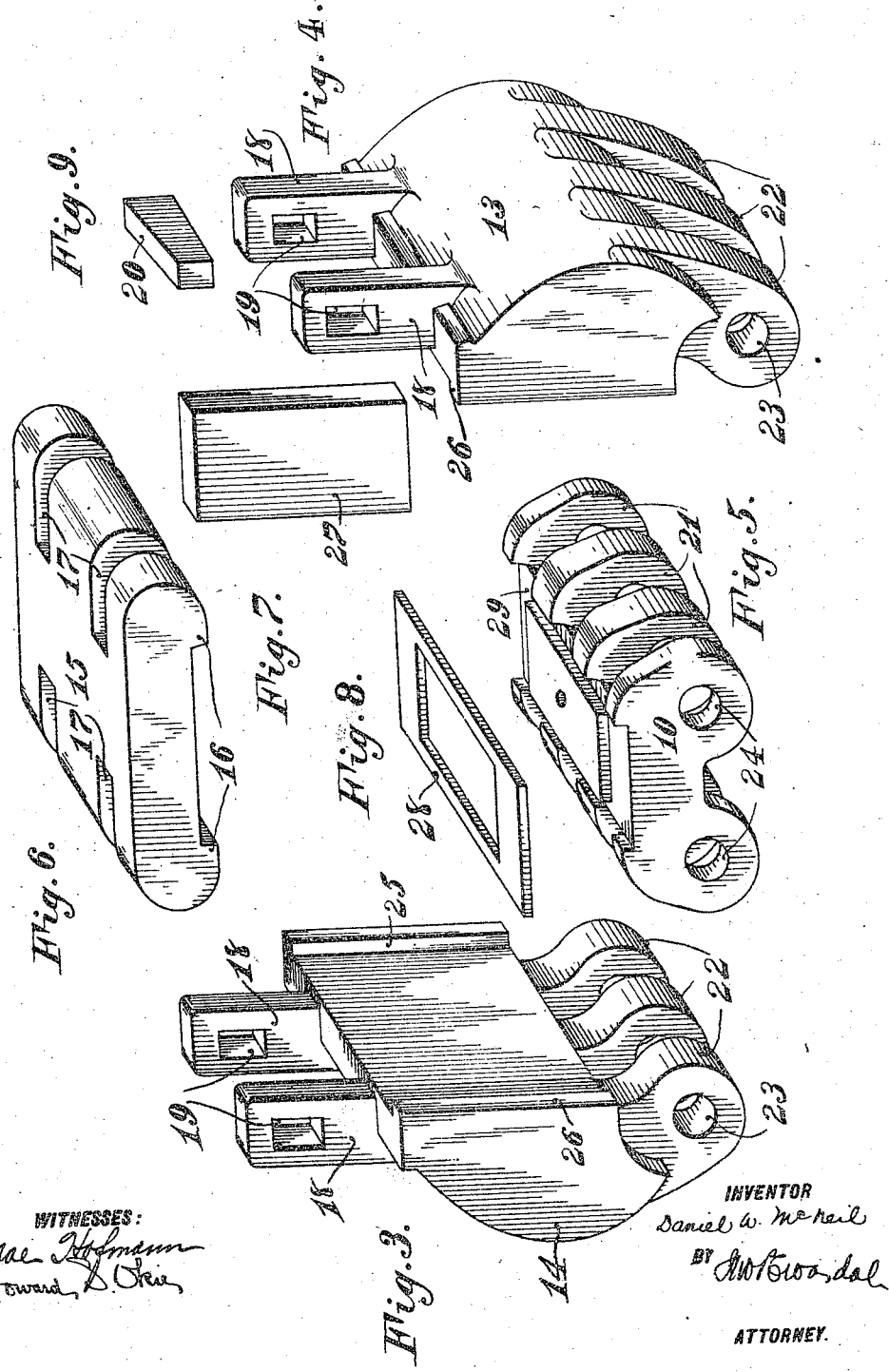

DANIEL W. McNEIL, OF NORWOOD, OHIO, ASSIGNOR TO THE JOHN DOUGLAS COMPANY, A CORPORATION OF OHIO.

METHOD FOR MOLDING CLAY OR SIMILAR MATERIAL.

1,142,342. Specification of Letters Patent. Patented June 8, 1915.

Original application filed February 9, 1910, Serial No. 542,826. Divided and this application filed September 13, 1910. Serial No. 581,842.

*To all whom it may concern:*

Be it known that I, DANIEL W. McNEIL, a citizen of the United States, residing at Norwood, in the county of Hamilton, State of Ohio, have invented a new and useful Method for Molding Clay or Similar Material, of which the following is a specification.

My invention relates to improvements in the art or method of molding clay or similar material.

The object of the invention is to provide a convenient method or process of subjecting a nearly dry powdered material to the required pressure in a properly shaped mold, and of readily removing the product from the mold, whereby the material forming the article molded shall contain a minimum amount of moisture.

My process or method comprises the following steps,—confining a nearly dry powdered material, such as clay, in approximately the form or shape of the finished material, except that its walls are thicker, then subjecting the same to pressure, which compacts the walls so that the whole mass holds together and is self-sustaining and can be removed to a kiln, then subjecting the same to the usual treatment in a kiln.

This application is a divisional of my copending application filed Feb. 9, 1910, Serial No. 542,826.

As an example of a preferred or suitable mechanism whereby the process comprising my invention may be readily realized, I will describe an apparatus which is illustrated in the accompanying drawings:—

Figure 1 is a vertical section on line 1—1 of Fig. 2. Fig. 2 is a side elevation with part in section. Fig. 3 is a perspective view of one of the movable sides of the mold. Fig. 4 is a perspective view of the other movable side. Fig. 5 is a similar view of the bottom element of the mold. Fig. 6 is a similar view of a top element. Fig. 7 is a similar view of an end element. Fig. 8 is a perspective view of a supporting frame. Fig. 9 is a perspective view of a wedge.

Similar numerals refer to similar parts throughout the several views.

The apparatus illustrated in the said drawings is adapted to mold a tank of clay material such as earthenware or vitreous china.

Fig. 1 indicates the several parts in assembled operative relationship.

10 is the base of the mold, to which are pivotally secured or hinged by the pivot pins 11 and 12 the side elements 13 and 14. The top element 15 is recessed, as clearly shown in Fig. 1, to coöperate in locking in operative position, the side elements 13 and 14. Element 15 is provided with the shoulders 16 for engaging the upper ends of elements 13 and 14 to prevent their opening outwardly. Element 15 is also provided with the recesses 17 adapted to engage the arms 18 of said side members 13 and 14. Arms 18 are provided with apertures 19 for receiving the wedges 20, which lock the elements 13, 14 and 15 securely together. The bottom element 10 is also provided with recesses 21 for receiving the fingers 22 of elements 13 and 14. The fingers 22 of members 13 and 14 are provided with the apertures 23, and the member 10 is provided with the registering apertures 24 for receiving the pivot pins 11 and 12.

The side members 13 and 14 are provided with the shoulders 25 and 26 for engaging the end pieces 27 for holding same in position.

The frame 28 is adapted to fit in the recess 29 of bottom member 10. This frame 28 provides means for supporting and removing the molded article 36, when the same has been compressed.

When the several parts are assembled in the operative position a mold is formed having the shape of the exterior of the tank to be pressed therein.

The expansible chum or core 30 is made of heavy rubber or other similar material, having walls of such thickness and consistency as to make the same self-supporting, that is, able to retain its shape under normal conditions, and also to enable it to support the weight of clay or similar material to be used in forming the article 36. This chum 30 is provided with a horizontal inwardly extending rim or lip 31, adapted to rest upon the top of base 10. Upon this rim 31 rests the frame 32 which is clamped down by the yokes 33 and bolts 34. By tightening the nut 35, the frame 32 is pressed firmly against the rim or lip 31 of chum 30 holding the same securely to the base, and preventing any leak of fluid or air between the chum and the base member 10.

The base 10 is provided with the vertically extending channel 37, adapted to open into the mouth of the chum 30. The lower portion of the channel is connected with the tee 38 which is provided with the threaded opening 39 for connection with a suitable pump or compressor not shown. The pipe 40 extends from near the top of the chum through channel 37 downwardly, and is open at the top and is controlled near its lower extension by the cock 41.

It will be understood that the inner walls of the mold correspond to the outer surface of the article to be formed thereby. The chum or core is of corresponding shape, but of less dimensions; that is, when normal, it is of sufficiently less dimensions to provide just space enough between it and the mold to receive the required amount of clay or similar material to form the article to be molded.

The method or process of molding the article may be described as follows: The mold is placed in the position shown in Fig. 1, with the exception that the cap or top element 15 is removed. The space between the core or chum 30, and the sides and ends 13, 14 and 27 of the mold, is filled with loose material. This material, which is in the form of a nearly dry powder, is practically poured into the mold about the core, and the top of the core or chum 30 is also covered with a sufficient thickness of said material. The cap or top 15 is then put into place as shown in Fig. 1, and locked firmly in said position by the wedges 20. Fluid or compressed air is then made to enter through tee 38, and pass through the channel 37 to the interior of core or chum 30, causing the said core or chum to expand and press the surrounding material against the inside walls of the mold. It will be understood that the material, while in the loose unconfined state, resembles an almost dry powder, but when the same is put under considerable pressure, as by the expanding of the core in the mold, a sufficient proportion of moisture will be contained in the mass to cause the mass to maintain the shape in which it has been compressed. The amount of such moisture required to maintain the mass in its compressed shape is comparatively extremely small, so that the compressed article is almost dry enough for the kiln as soon as it comes out of the mold. This is obviously a great improvement in the method of molding clay articles now in common use, in which the clay is placed in the mold in a wet or plastic state. That is to say, when the material is formed by hand upon the core, a great deal of moisture is required to hold the clay in place while the mold is being assembled; and after such clay has been pressed, the moisture is so great that it requires a great deal of time for the piece of work to dry, while, as above stated, by my process the article is almost dry enough to be placed in the kiln immediately as it comes out of the mold.

If fluid is used in expanding the core or chum, the cock 41 is opened to permit the escape, through pipe 40, of air displaced by the fluid. As soon as the water, for example, is seen to escape through pipe 40, the cock 41 is closed.

As soon as sufficient pressure is exerted upon the material in the mold, by expanding the rubber chum, the fluid is permitted to escape from the core or chum, through tee 38. This permits the chum to assume its original dimension. The cap or top 15 is then removed, the sides 14 and 13 are opened up, and the ends 27 are also removed. The rectangular frame 28 may now be lifted to remove the compressed article 36 from over the core or chum 30. The article is then carried to the kiln and fired in the usual way.

What I claim is:—

1. The method, which consists in filling the space between a mold for an object having a side or sides and an inclosed end meeting at a relatively sharp angle, and an inclosed elastic core, of normally corresponding and nearly the same contour, but of lesser dimensions, with a nearly dry powdered clay, and then expanding the core by fluid pressure.

2. The method of making hollow ware having a side or sides and an inclosed end meeting at a relatively sharp angle, of clay or similar material, which consists in confining the material in a nearly dry powdered state in approximately the shape and nearly the same dimensions of the article to be formed, and then subjecting the same to fluid pressure from within.

3. The art of making hollow ware having a side or sides and an inclosed end of clay or similar material, which consists in confining the material in a nearly dry powdered state in approximately the form and of nearly the same dimensions as the article to be produced and then subjecting the same to pressure in the several directions of the thickness of its walls.

4. The art of making hollow ware having a side or sides and an inclosed end of clay or similar material, which consists in confining the material in a nearly dry powdered state, in approximately the form and of nearly the same dimensions as the article to be produced, then subjecting it to fluid pressure from within to compact the nearly dry clay and burning the product.

DANIEL W. McNEIL.

Witnesses:
 JESSIE DAHLMAN,
 RICHARD MATHERS.